United States Patent
Kerz

(10) Patent No.: US 6,687,021 B1
(45) Date of Patent: Feb. 3, 2004

(54) METHOD FOR DIGITALLY RASTERIZING HALF-TONE IMAGES WITH RASTERS OF ANY WIDTH AND ANGLE

(75) Inventor: Ludo Kerz, Saulheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/424,814

(22) PCT Filed: May 14, 1998

(86) PCT No.: PCT/DE98/01346

§ 371 (c)(1),
(2), (4) Date: Nov. 29, 1999

(87) PCT Pub. No.: WO98/54889

PCT Pub. Date: Dec. 3, 1998

(30) Foreign Application Priority Data

May 30, 1997 (DE) .......................................... 197 22 697

(51) Int. Cl.⁷ .......................... G06K 15/00; H04N 1/405
(52) U.S. Cl. .......................... 358/1.9; 358/3.13; 358/3.2
(58) Field of Search ................................. 358/1.9, 3.06, 358/3.13, 3.2, 534, 535, 536

(56) References Cited

U.S. PATENT DOCUMENTS

| 4,499,489 A | 2/1985 | Gall et al. |
| 4,700,235 A * | 10/1987 | Gall .......................... 358/3.19 |
| 5,469,516 A * | 11/1995 | Kerz .......................... 382/254 |
| 5,642,436 A | 6/1997 | Kerz |

\* cited by examiner

Primary Examiner—Thomas D Lee
(74) Attorney, Agent, or Firm—Schiff Hardin & Waite

(57) ABSTRACT

In a method for digital rastering of a half-tone image with rasters having arbitrary screen widths and screen angles, the rastering occurs by reading out a threshold matrix and comparing the thresholds that are read out to the color values of the half-tone image. For that purpose, a threshold matrix is employed wherein the thresholds represent one or more raster dots of a raster arranged at an angle, the desired screen width and the desired angle being approximated therewith. During the readout of the thresholds, an error between the desired raster and the raster approximated by the threshold matrix is calculated, and the error is compensated by a correction of the readout address for the threshold matrix as soon as the error exceeds a predetermined limit value. Alternatively, stored bit patterns can be employed instead of the threshold matrix, these having been acquired by comparing the tonal values to be reproduced to a threshold matrix.

15 Claims, 3 Drawing Sheets

METHOD FOR DIGITALLY RASTERIZING HALF-TONE IMAGES WITH RASTERS OF ANY WIDTH AND ANGLE

BACKGROUND OF THE INVENTION

The invention is in the field of electronic reproduction technology and is directed to a method for the production of rastered color separations with rasters having arbitrary screen widths and screen angles.

Tonal gradations cannot be undertaken in most printing processes because ink is either applied onto the printed matter or not in these processes. Color dots arranged in grid-like fashion are therefore printed next to one another for simulation of tonal gradations. A brighter or darker tone optically arises by varying the size of the color dots. These color dots are also referred to as half-tone dots, their spacing from one another as representing screen width and the angle of the half-tone dot grid relative to the x-axis representing screen angle. Work is usually carried out with four rasters having the same screen width and the screen angles of 0, 15, 45 and 75 degrees for minimizing what is referred to as moiré for four-color printing with the inks cyan, magenta, yellow and black. Even minimal deviations therefrom cause moiré and, thus, poor or unusable image reproductions.

The rastered print masters are produced with digitally working exposers in the Prior Art. These use a light source in order to illuminate a light-sensitive surface. This light source can be displaced in steps in the x-direction and the y-direction relative to the print master and can be designationally turned on and off. Small surface elements, also called device pixels, thereby derive, these being capable of being individually illuminated or not dependent on the control of the light source. Half-tone dots are constructed of a plurality of device pixels given these digital exposers. Each device pixel is represented by a bit in a memory in a preceding computer unit, also called a RIP (raster image processor). The totality of these bits is referred to as a bit map and is a digital image of the device pixels.

A number of methods for digital rastering have become known in the past, these being capable of being divided into 3 groups, what are referred to as irrational rastering methods (referred to below as IS, IS method or IS technique), what are referred to as rational rastering methods (referred to below as RT, RT method or RT technique) and frequency-modulated rastering methods. These names can be explained based on the fact that screen angles having an irrational tangent are employed in the irrational rastering methods and screen angles having a rational tangent are employed in the rational rastering methods. For example, an irrational rastering method is disclosed by German Letters Patent DE 28 27 596 C2, and rational rastering methods are disclosed by German Letters Patent DE 28 27 596 and by European Patent Publication Number 0 539 387 B1.

What these two rastering methods have in common is that a digital image of the raster dots exists in the memory of the RIP, this also being called "threshold hill" or threshold matrix. The term "threshold memory" is also used in this context. This image is composed of a group of numerical values, what are referred to as the thresholds. For producing the digital print masters, also referred to as a rastering process or a rastering, a threshold is selected from the threshold hill for each bit of the bit map according to a rule dependent on the rastering method and is compared to a digital color tone signal allocated to the bit of the bit map, which is usually acquired by scanning an original or is read out from a memory, and the corresponding bit is set or not dependent on this comparison and, thus, the corresponding device pixel of the exposer is also blackened or not. The procedure of defining the threshold allocated to a bit is also called threshold access.

In the IS method, the threshold memory is composed of the digital image of a single raster dot that is deposited under an angle of 0 degrees. In the rastering, a complex calculating rule must be implemented for each bit to be rastered. Both the screen width as well as the screen angle—also referred to only as raster below—must be taken into consideration.

In the RT method, the threshold memory is composed of the digital image of one or more raster dots. Screen width and screen angle are already taken into consideration when the thresholds are deposited in the memory, and the thresholds are organized in the memory such that the thresholds of neighboring bits are also neighbors in the threshold memory. The calculating process given a threshold access is thus essentially reduced to an address incrementation.

The two methods have a completely different technical realization as relates to the method of execution for producing the rasters. On the other hand, the two methods have different technical advantages and disadvantages, for which reason the one rastering method is sometimes favored in practice, and sometimes the other. Since only a single raster dot is deposited in the threshold memory given the IS method, there is a far lower need for memory space. Further, the calculating process for the selection of the thresholds allows the exact realization of all rasters, particularly the irrational angles 15 and 75 degrees that are important for color printing. The RT methods, by contrast, can only approximate the demanded screen angles with values that can be described by a rational tangent, whereby the need for threshold memory space increases approximately quadratically relative to the precision. The advantage of the RT method is comprised therein that the rastering process can be realized with less expense both in terms of hardware and software and better performance can be realized, whereby the IS methods fare especially badly in the realization in software. This is especially true when large areas are to be rastered with a uniform degree of surface coverage. For the RT methods, a bit pattern that corresponds to the degree of surface coverage can be produced, and this bit pattern then only has to be copied. For the IS method, each bit to be rastered, by contrast, must fundamentally be separately calculated. In the RT methods, moreover, it is not necessary to add noise. Noise is usually added in the IS methods in order to cover artifacts that arise given these methods. In practice, this leads to raster dots with torn edges that have a disadvantageous effect in terms of printing technology. Over and above this, the noise in large areas with constant surface coverage is expressed in the form of an optical restlessness of the reproduced image.

U.S. Pat. No. 5,315,407 discloses an improvement of the IS method with which the restlessness that is produced due to the somewhat different shape of neighboring raster dots is to be reduced. To that end, the coordinates for addressing the threshold matrix are modified such that the midpoint of every raster dot is shifted onto the respectively closest device pixel. As a result thereof, the raster dots are lent a more uniform shape. This method, however, also exhibits the fundamental disadvantage of the IS method that a complex calculation of the addresses for the threshold access is to be calculated for each bit to be rastered.

SUMMARY OF THE INVENTION

An object of the invention is to specify an improved rastering method that avoids the disadvantages of the known methods and assures a high reproduction quality.

The invention achieves this in that a raster like that disclosed by European Letters Patent EP 0 539 397 B1 is approximated by a threshold hill, and that a continuous error calculation during the rastering process describes the deviation from the required rated value and, given upward transgression of an error tolerance limit, continues the rastering at a different location of the threshold hill, so that the error sum that has thereby accumulated is compensated.

The method disclosed here unites the advantages of the two rastering methods with one another in an optimum way. As in the IS technique, on the one hand, the method allows work to be carried out with slight threshold memory space and to exactly reproduce arbitrary rasters, and, as in the RT technique, secondly allows a fast and simple realization in hardware and, in particular, in software as well as allows the superimposition of noise to be foregone. For rastering large areas with constant color value, further, a corresponding bit pattern as in the RT technique can be produced and simply copied into the bit map. Further, it is possible to calculate the bit patterns for all color value signals employed in advance and deposit them in the memory. This is especially advantageous since clearly lower costs arise as a result of the smaller threshold memory. It is also possible to simply merely copy the bit patterns, even given a changing color value signal.

DESCRIPTION OF THE PREFERRED EMBODIMENT

Figure 1:
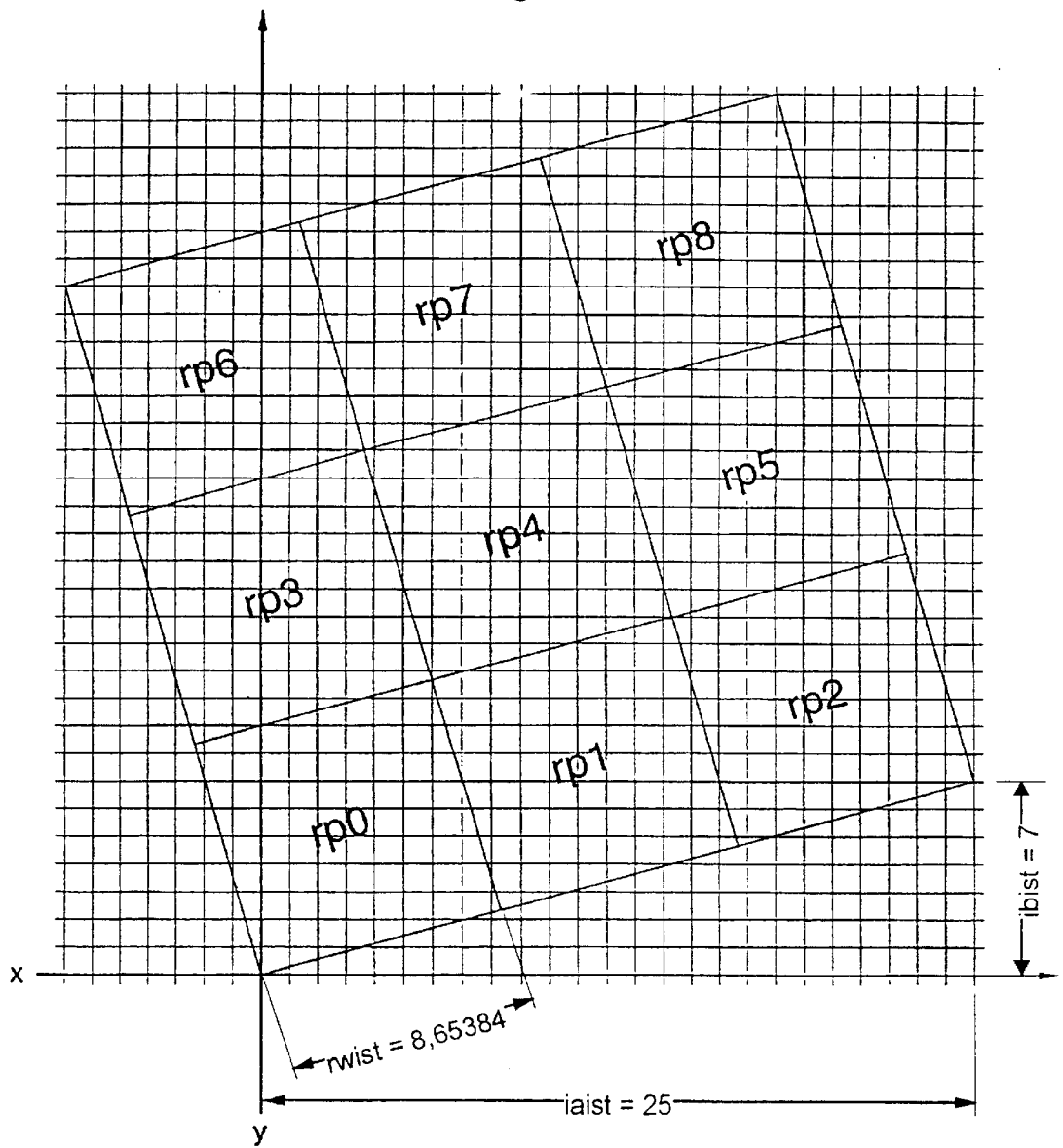
FIG. 1 shows an excerpt from a bit map superimposed with a rational threshold hill composed of 3×3 raster dots or, respectively, raster dot cells that are referenced rp0 . . . rp8. Additionally, the coordinate axes x and y of a Cartesian coordinate system are entered.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

The preferred embodiment is explained in greater detail below with reference to a practical example. For example, an irrational raster, as shown in FIG. 3, is to be produced with the parameters rwsoll=8.485282 pixels asoll=15 degrees.

Figure 2:
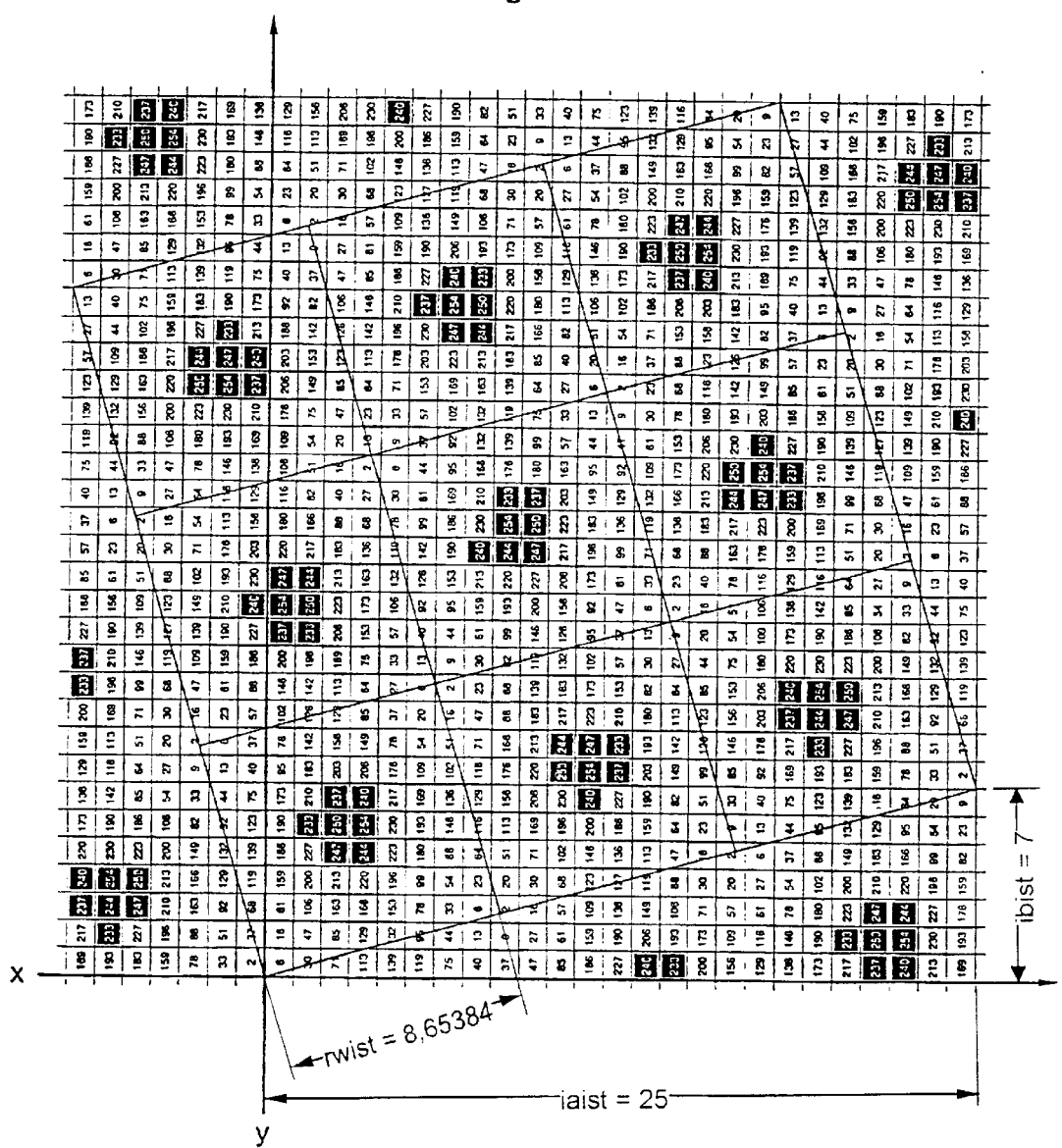
FIG. 2, in addition to FIG. 1, shows an exemplary allocation of threshold values to every bit of the bitmap. Further, a number of bits are marked black in the drawing in order to illustrate what the result of the bit map and, thus, of the illumination as well looks like given the rastering with a constant color value signal.
Figure 3:
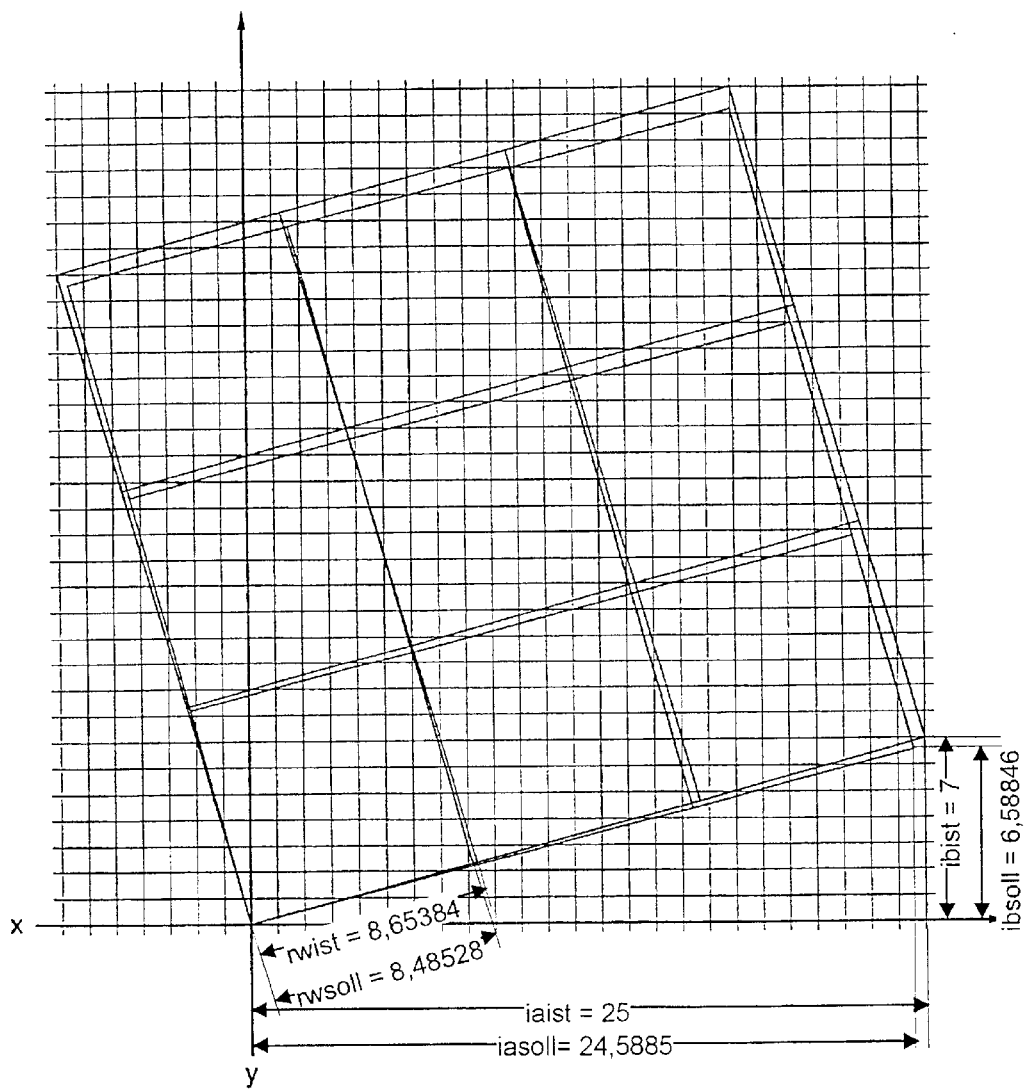
FIG. 3, in addition to FIG. 1, shows an irrational raster that is to be approximated by the rational raster.

It is assumed that this raster is approximated by a rational threshold hill with respectively rp×rp raster dots, as shown in FIGS. 1, 2 and 3. The following parameters are entered in FIG. 1:

iaist=25 ibist=7 rp=3.

The following quantities are derived by calculation:

$$rwist = sqrt(ia*ia + ib*ib)/rp = 8.653836 \text{ pixels}$$

$$aist = atan(ib/ia) = 15.642246°$$

$$iasoll = rp*rwsoll*cos(asoll) = 24.588461$$

$$ibsoll = rp*rwsoll*sin(asoll) = 6.588457.$$

Amount and direction of the error that derives after rwist*rp pixels under the angle aist are calculated from the quantities iaist, ibist, iasoll, ibsoll:

$$cerr = sqrt(da*da + db*db) = 0.582009$$

$$aerr = atan(db/da) = -135°,$$

whereby:

da=iasoll−iaist db=ibsoll−ibist.

Since the error is rotational-symmetrical relative to the coordinate origin, the deviation error is determined therefrom in the rastering along the x-axis and y-axis.

$$dxa = cerr*cos(aerr-aist)/(rwist*rp) = -0.019539$$

$$dxb = cerr*sin(aerr-aist)/(rwist*rp) = -0.010991$$

$$dya = cerr*cos(aerr-aist+90)/(rwist*rp) = 0.010991$$

$$dyb = cerr*sin(aerr-aist+90)/(rwist*rp) = -0.019539.$$

The values dxa and dxb are to be understood such that the error between rated and actual increases in the x-direction by dxa bits and increases in the y-direction by dxb bits with every bit by which one moves away from the coordinate origin in the x-direction. The values dya and dyb are to be understood such that the error between rated and actual increases in the x-direction by dya bits and in the y-direction by dyb bits with every bit by which one moves away from the coordinate origin in y-direction. A error in the reproduction of the required raster for the bit at the position x,y in the bit map is calculated as erra=y*dya+x*dxa errb=y*dyb+x*dxb from the quantities dxa, dxb, dya and dyb.

After the size of the error has been quantified in this way, this error is corrected. This is described in a simple form with a series of steps. Normally, the rastering process is implemented line-by-line, i.e. all bits for y=0 and x=0 . . . n are rastered first, then for y=1 and x=0 . . . n, etc. A threshold access is implemented with loop counters x and y and counters xa offset and xboffset, which are yet to be explained. The threshold determined in this way is compared to an external color value signal, and the bit x,y of the bit map is set or not dependent on the result thereof. The error for each X-loop pass is added up in counters xaerr and xberr. The analog occurs for each Y-loop pass. When the error added up in xaerr and xberr becomes greater than 1 bit, then the error is corrected. When, for example, xaerr becomes smaller than −1, then 1 is subtracted from xa offset. When we assume that xa offset was previously equal to 0, then it is no longer the threshold for x but the threshold for x−1 that is accessed in all further X-loop passes given the threshold accesses. The actual correction is implemented as a result thereof. In further, successive X-loop passes, xa offset becomes −2, −3, etc., and is taken into consideration as a correction in the threshold accesses. The analog occurs for each Y-loop pass. The counters are initialized before every X-loop pass with the error and correction values already predetermined in the Y-loop. Analogous thereto, the same counters are initialized to 0 before the first Y-loop pass. This simple method of correction, whereby entire thresholds are skipped or doubly accessed in the correction leads to an adequate result in many instances. In order, however, to further-optimize the method, one proceeds as follows.

In FIG. 1, rp0 has its lower left corner lying exactly on whole coordinates of the bit map. The lower left corner of rp7, by contrast, is shifted by −1/rp=0.333333 relative to whole coordinates in x-direction. The closest whole coordinates are 4,19. Analogous shifts in positive and negative x-direction and y-direction are established for rp4, rp5 and rp8. These raster dots respectively shifted by plus/minus 1/rp in x-direction and y-direction to whole coordinates already allow errors to be corrected when error becomes greater than plus/minus 1/rp. To this end, the closest coordinates of the corresponding raster dot are respectively added up to xa offset and yaoffset.

A program fragment for execution of this refinement will now be described. The coordinates rp4, rp5, rp7 and rp8 are provided. The maximum error maxerr is prescribed with 1/rp=0.3333. For example, xaerr is no longer checked for less than −1 but for less than −maxerr. When this is the case, then the coordinates of rp7 are added up onto xa offset and xboffset. As a result thereof, thresholds apparently shifted by ⅓ are accessed in all further threshold accesses and, thus, the error is significantly more finely corrected.

Errors are added up for every X-loop pass and the upward transgression of the error limits is checked. In order to speed the method up further, the plurality of bits that can be rastered without error correction can be defined in advance, and these can be rastered at the segment and the overall errors can then be added up and corrected.

Further, another optimization can occur in that bit patterns are calculated in advance for all occurring color values. The X-loop condition becomes correspondingly more complicated, since how many bits given a constant color value of a bit pattern can be copied without correction is now defined. Instead of an access to the threshold hill, an access to the bit pattern with the required color value has been undertaken, whereby constbits from the address x+xa offset, y+xboffset are copied to tmp. These are then copied into the bit map. The errors for all constbits are added up all at once. Finally, constbits are also added up onto the loop counter.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

What is claimed is:

1. A method for digital rastering of an original image to generate a half-tone image with a desired raster having an arbitrary screen width and arbitrary screen angle, comprising the steps of:

providing a threshold matrix for a given raster having a given screen width and screen angle, and having an input for receiving an x, y access address and an output for outputting a threshold value corresponding to the input x, y access address;

providing x, y addresses for said desired raster;

generating an x, y pixel address corresponding to a pixel to be recorded and reading an image value from the original image corresponding to said x, y pixel address;

for said generated x, y pixel address, comparing a corresponding x, y address of the desired raster with a corresponding x, y access address of the threshold matrix, and, if a deviation is greater than a predetermined limit value, then correcting the x, y access address of the threshold matrix;

inputting said corresponding and sometimes corrected x, y access address into the threshold matrix and outputting a corresponding threshold value; and comparing said threshold value with said read image value and, depending on the comparison, exposing or not exposing said pixel to be recorded.

2. A method according to claim 1 wherein said deviation is continuously determined for each generated x, y pixel address.

3. The method according to claim 2 wherein the correction of the x, y access addresses occurs by adding or subtracting a correction value to or from at least one of the x and y components of the access address.

4. The method according to claim 1 wherein when said deviation is greater than said predetermined limit value, then at least one of the x, y components of the access address is corrected by increasing or decreasing the respective address by one pixel.

5. The method according to claim 1 wherein the correction of the x, y access address of the threshold matrix occurs by adding or subtracting correction values to or from at least one of the x, y components of the address as soon as the respective x, y address components exceeds the limit value.

6. The method according to claim 1 wherein the limit value has x and y components which are respectively utilized in determining whether the corresponding x or y components of the access address is corrected.

7. The method according to claim 1 wherein said threshold matrix comprises a plurality of raster dot cells with each cell being employed for creation of a half-tone raster dot based on exposure of pixels within the raster dot cell;

said predetermined limit value comprises x and y components which respectively correspond to a fraction of one step of x, y components of said access address for the threshold matrix;

corner points of the raster dot cells are selected that are shifted by a fraction of a step of said access address in an x or y direction relative to an entire access address step; and whole number x, y address components lying closest to said corner points are employed as a correction value.

8. The method according to claim 7 wherein a coordinate of the selected corner points lies on a whole access address step and the other coordinate is displaced by a fraction of an access address step.

9. The method according to claim 8 wherein one coordinate of the selected corner points lies on a whole access address step and the other coordinate is shifted by a as small as possible fraction of an access address step.

10. The method according to claim 1 wherein after determining said deviation for said generated x, y pixel address, it is determined in advance how many succeeding generated x, y pixel addresses will occur until said deviation becomes greater than said predetermined limit value, and at that time then correcting the x, y access address of the threshold matrix.

11. A method for digital rastering of an original image to generate a half-tone image with a desired raster having an arbitrary screen width and arbitrary screen angle, comprising the steps of:

provide a threshold matrix for a given raster having a given screen width and screen angle, and having an input for receiving an access address and an output for outputting a threshold value corresponding to the input access address;

providing addresses for said desired raster;

generating a pixel address corresponding to a pixel to be recorded and reading an image value from the original image corresponding to said pixel address;

for said generated pixel address, comparing a corresponding address of the desired raster with a corresponding access address of the threshold matrix, and, if a deviation is greater than a predetermined limit value, then correcting the access address of the threshold matrix;

inputting said corresponding and sometimes corrected access address into the threshold matrix and outputting a corresponding threshold value; and comparing said threshold value with said read image value and, depending on the comparison, deciding how said pixel is to be recorded.

12. A method for digital rastering of an original image to generate a half-tone image with a desired raster having an arbitrary screen width and arbitrary screen angle, comprising the steps of:

providing a threshold matrix for a given raster having a given screen width and screen angle, and having an input for receiving an access address and an output for outputting a threshold value corresponding to the input access address;

providing addresses for said desired raster;

generating a pixel address corresponding to a pixel to be recorded and reading an image value from the original image corresponding to said pixel address;

for said generated pixel address, comparing a corresponding address of the desired raster with a corresponding access address of the threshold matrix, and, if a deviation is greater than a step of said access address, then correcting the access address of the threshold matrix;

inputting said corresponding and sometimes corrected access address into the threshold matrix and outputting a corresponding threshold value; and comparing said threshold value with said read image value and, depending on the comparison, deciding how said pixel is to be recorded.

13. A method for digital rastering of an original image to generate a half-tone image with a desired raster having an arbitrary screen width and arbitrary screen angle, comprising the steps of:

providing a threshold matrix for a given raster having a given screen width and screen angle, and having an input for receiving an access address and an output for outputting a threshold value corresponding to the input access address;

for each image value that pixels of the original image can assume, generating and storing a bit pattern by comparing the threshold values of the threshold matrix with said image value, and depending on the comparison, deciding which bit value is to be stored in the bit pattern, the bit pattern having an input for receiving an x, y access address and an output for outputting a bit value corresponding to the input x, y access address;

providing x, y addresses for said desired raster;

generating an x, y pixel address corresponding to a pixel to be recorded and reading an image value from the original image corresponding to said x, y pixel address;

for said generated x, y pixel address, comparing a corresponding x, y address of the desired raster with a corresponding x, y access address of the bit pattern stored for said image value, and if a deviation is greater than a predetermined limit value, then correcting the x, y access address of the bit pattern;

inputting said corresponding and sometimes corrected x, y access address into said bit pattern and outputting a corresponding bit value; and depending on said bit value, exposing or not exposing said pixel to be recorded.

14. The method according to claim 13 wherein when said deviation is greater than said predetermined limit value, then at least one of the x, y components of the access address is corrected by increasing or decreasing the respective address component by one pixel.

15. A method for digital rastering of an original image to generate a half-tone image with a desired raster having an arbitrary screen width and arbitrary screen angle, comprising the steps of:

providing a threshold matrix for a given raster having a given screen width and screen angle, and having an input for receiving an access address and an output for outputting a threshold value corresponding to the input access address;

for each image value that pixels of the original image can assume, generating and storing a bit pattern by comparing the threshold values of the threshold matrix with said image value, and depending on the comparison, deciding which bit value is to be stored in the bit pattern, the bit pattern having an input for receiving an access address and an output for outputting a bit value corresponding to the input access address;

providing addresses for said desired raster;

generating a pixel address corresponding to a pixel to be recorded and reading an image value from the original image corresponding to said pixel address;

for said generated pixel address, comparing a corresponding address of the desired raster with a corresponding access address of the bit pattern stored for said image value, and if a deviation is greater than a predetermined limit value, then correcting the access address of the bit pattern;

inputting said corresponding and sometimes corrected access address into said bit pattern and outputting a corresponding bit value; and depending on said bit value, exposing or not exposing said pixel to be recorded.

* * * * *